April 23, 1963 E. C. HORTON 3,086,401

TUNER SLIDE ASSEMBLY

Filed March 14, 1961

INVENTOR.
EDWARD C. HORTON

BY

Busser, Smith & Harding

ATTORNEYS 3,086,401
TUNER SLIDE ASSEMBLY

Edward C. Horton, Haddonfield, N.J., assignor, by mesne assignments, to Thompson Ramo Wooldridge Inc., Euclid, Ohio, a corporation of Ohio Filed Mar. 14, 1961, Ser. No. 95,619
11 Claims. (Cl. 74—10.33)

The invention relates to pushbutton tuners of the type generally used in radios for automobiles, and more particularly to improved pushbutton slide assemblies for such tuners.

Pushbutton tuners in the usual form involve tuning by the positioning of magnetic cores within coils forming variable inductances in the tuning circuit of the receiver. In John H. Teaf, Patent No. 2,301,090, dated November 3, 1942 and Patent No. 2,898,767, dated August 11, 1959, there are disclosed pushbutton assemblies of a type which has been widely used. These assemblies involve generally a slide member carrying an adjustable cam engageable with a treadle bar the angular position of which determines the tuning position of the variable reactors, which may be either variable condensers or variable inductances, the latter being primarily used at the present time. A second slide member is movable relative to the first. When the second slide member is withdrawn outwardly relative to the first, the adjustable cam is free to oscillate and under such conditions the resetting of the slide assembly takes place by manual adjustment of the treadle bar, followed by inward movement imparted to the pushbutton which results, sequentially, in first bringing the cam into engagement with the treadle bar, whereby the cam is positioned, and then by relative movement of the two slide members an action of the locking lever mounted on the first member into tight clamping engagement with the cam. The two slides together are then moved outwardly by spring action upon release of the pushbutton, with the result that each time the slide assembly is again moved inwardly the locked cam will oscillate the treadle bar to the position corresponding to the setting attained.

As pointed out particularly in the last-mentioned patent, the entire range of movement of tuning cores is necessarily limited by space but nevertheless the range of tuning adjustment must cover the broadcast band. Since the receivers, to be satisfactory, must be highly selective, it is evident that to secure repeated tuning of particular stations the pushbutton tuning means must very precisely position the cores in each operation. Play of parts must accordingly be reduced to a very small amount, although the tuning assembly necessarily must be mass-produced and generally is constituted by stamped sheet metal parts.

While pushbutton assemblies such as the more recent type disclosed in Patent No. 2,898,767 have been satisfactory in operation, the present application is principally concerned with further matters leading to improvements. One of the primary considerations in the manufacture of tuners is the reduction in the number of parts constituting a pushbutton assembly and in the avoidance of complex precision parts in order that the manufacturing costs of these assemblies may be minimized. The proportionate cost of the pushbutton assembly in a complete tuner is appreciable owing to the small scale and minimum play of parts required and, accordingly, simplification of construction is important. A second consideration which is a factor in industry acceptance and public relations is the serviceability of pushbutton assemblies. In the course of time parts are bound to wear out and the replacement of a single component element versus replacement of the whole assembly may be determined by the simplicity with which the assembly is disassembled, repaired and reassembled. Generally, however, in prior art pushbutton assemblies the parts are held together by means such as riveting, crimping, upsetting, welding and soldering, whereby simplicity of assembly and disassembly is impaired. Also involved is the desirability of being able to repair a pushbutton assembly without removing it from the tuner.

As discussed particularly in said Patent 2,898,767, certain unusual circumstances may give rise to misoperation. For example, if for some reason sliding movement of the first-mentioned slide member is restrained, the attempt to effect resetting may involve a premature relative movement of the second slide member relative to the first, with the result that locking of the cam may occur before the cam attains its final position, which should be determined by the manually adjusted treadle bar. Accordingly, means generally are provided to offer some resistance to relative movement of the slide members. Also, when the second slide member is moved outwardly relative to the first the cam should unlock readily, and for this reason provision also is made to facilitate this unlocking. Excessive vibration also may cause trouble in that the slide members may move apart sufficient to release the cam and thus undo the pushbutton setting.

It is an object of the invention to provide an improved tuner construction in which the above discussed considerations of low manufacturing costs and serviceability are afforded, while nevertheless maintaining, and in fact improving, the dependability and precision of operation of the tuner. In particular, it is an object of the invention to provide a simple pushbutton assembly which does not involve the permanent or semi-permanent fastenings which are characteristic of prior art assemblies as mentioned above and which can be easily assembled and disassembled.

Further objects and advantages will become apparent from the following description read in conjunction with the drawing, in which.

Figure 1:
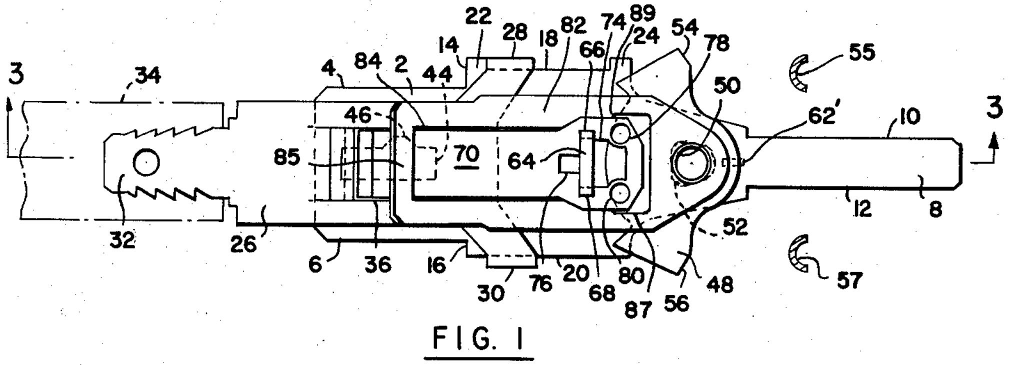
FIGURE 1 is a top plan view of the slide assembly showing the cam released.

The main slide member is indicated at 2 and is formed of relatively heavy stamped sheet metal. The left end of member 2 provides a pair of parallel guide edges 4 and 6 and the other end of the member, in the form of a tongue 8, provides parallel guide edges 10 and 12, these guide edges being adapted for close fitting reception in guide channels provided in the frame of the tuner which is conventional and, therefore, not shown. Edges 4 and 6 terminate at shoulders 14 and 16, and member 2, intermediate its length, presents further guide edges 18 and 20 for coaction with an actuating slide member described hereafter. Edge 18 is flanked by additional projections 22 and 24 acting as stop members, as will appear hereafter.

The actuating slide member is indicated at 26 and is also formed of stamped sheet metal. A pair of arms 28 and 30 of member 26 are turned downwardly to slidably engage the aforementioned edges 18 and 20 of main slide member 2, and at its other end member 26 has a serrated tang 32 on which an operating button 34 may be secured in conventional manner. Member 26 is coined or stamped out at 36 to form an abutment or finger 38 which is bent first upwardly and then downwardly, terminating in end 40 having an ear 42 adapted to overhang the bottom surface of member 2 (FIGURE 4), as will appear hereafter. To accommodate finger 38 main slide member 2 has an opening 44 having a minimum width less than the width of finger 38 across its end 40 and ear 42. However, for purposes of assembly appearing hereafter, the opening 44 is widened at 46 (FIGURE 4).

An element which will be referred to herein as a cam is identified at 48 and is pivotally mounted on a pivot 50 formed in main slide member 2 by a punch and die operation. It will be noted that an opening, indicated at 52, in cam 48 is not circular but is of trapezoidal shape with its sides converging toward the forward end of slide member 2. While clearance is provided in opening 52 for free rotation of cam 48 about pivot 50, as the cam is pressed against the treadle bar the converging edges engage the pivot to effect accurate positioning thereof with respect to the member 2. Cam 48 is provided with flats 54 and 56 adapted to engage the usual treadle bar assembly, which involves rounded elements 55 and 57. It will be understood (as fully described in said Patent 2,898,767) that the initial setting of the pushbutton assembly and the rotational adjustment of cam 48 is determined by engagement of flats 54 and 56 with the elements 55 and 57 in the position in which the latter have been set by manual operation.

Figure 4:
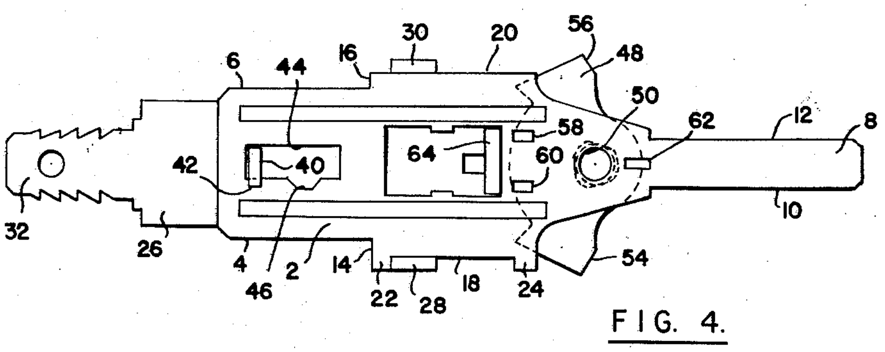
FIGURE 4 is a bottom plan view of the assembly.

By the indentation of member 2 as indicated at 58, 60 and 62 in FIGURE 4, projections or bosses, two of which are indicated at 58′ and 62′, are provided on the upper surface of member 2. The lower side, and preferably both sides, of cam 48 is roughened, for example by ball or sand blasting or peening, whereby forcing the cam against the projections resulting from indentations 58, 60 and 62 effects a positive gripping of the cam in any angular position thereof.

Figure 2:
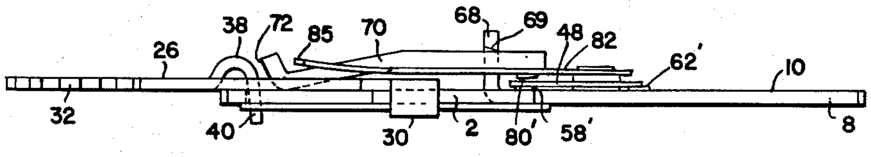
FIGURE 2 is a side elevation of the same.

A fulcrum member 64 is stamped out of main slide member 2 and bent upwardly, has ears 66 and 68 projecting therefrom at its upper end. The lower edge of each said ear bevelled as indicated at 69 to produce a sharpened fulcrum edge toward the right side of the member 64 as viewed in FIGURE 2.

A member which will be referred to hereafter as the lever is indicated at 70 and has an upturned cam surface at 72 in the line of inward movement of the abutment 38 on actuating slide member 26. The left end of lever 70 passes through the opening 36 in member 26, and rests upon the upper surface of member 2 when the slide members are in unlocked position. An opening 74 provided in lever 70 receives the shank of fulcrum member 64 but has a transverse dimension less than the width of fulcrum 64 across the ears 66 and 68. An extension 76 of opening 74 is slightly wider than the thickness of sheet metal used in the formation of main slide member 2, and thus it may receive the thickness of fulcrum 64 for purposes of disassembly discussed hereafter. The indenting of lever 70 at 78 and 80 creates downwardly extending projections or bosses 78′ and 80′ respectively on the underside of lever 70. These projections 78′ and 80′ are positioned opposite the cam 48 so that when forcibly moved downwardly they positively grip the cam.

Figure 3:
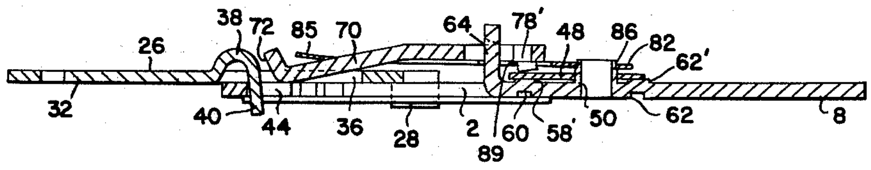
FIGURE 3 is a longitudinal cross-section taken on line 3—3 of FIGURE 1.

A leaf spring is identified at 82 and has an elongate opening slightly wider than the width of lever 70. The lever 70 projects through this opening 84 and under the end 85 of the spring 82, whereby end 85 rests upon the left end of lever 70 to urge the same downwardly. At the right end of spring 82 the opening is wider as indicated at 87, by virtue of which shoulders 89 are disposed immediately behind the bosses 78′ and 80′ for a purpose mentioned hereafter. At its right end (in the drawings) spring 82 has an aperture 86 whereby the spring is merely snapped over the reduced diameter end of pivot 50, as shown particularly in FIGURE 3, to hold it in place. The right hand portion of opening 84 terminates in a slightly wider portion as shown to permit the projection therethrough of projections 78′ and 80′ and engagement of cam 48. It will be noted that in its normal position spring 82 is bowed downwardly at its central portion, because its right and left ends bear downwardly on the shoulder of pivot 50 and on lever 70, respectively, at levels above the under surface of lever 70 at the location of fulcrum 64. Thereby the spring is tensioned and acts upwardly against the right end of lever 70, normally tending to disengage it from cam 48, and acts downwardly against the left end of lever 70 to resist its upward displacement by abutment 38.

The process of assembling the pushbutton slide assembly will now be described. First, members 2 and 26 are taken, and the actuating member 26 is placed over member 2 with end 40 and ear 42 thereof being projected through opening 44 at the location of widened portion 46. Member 26 then is moved outwardly to its position shown in FIGURE 4, for example. Second, cam 48 is placed over pivot 50. The next step involves taking lever 70 and spring 82 together, with the end of the lever projecting through opening 84 and under end 85. The lever 70 and spring 82 are placed at approximately a right angle to members 2 and 26 so that fulcrum member 64 passes through opening 74 and the extension 76 thereof. With lever 70 then positioned below the level of ears 66 and 68, lever 70 and spring 82 are rotated approximately 90° to bring them into line with members 2 and 26, whereupon spring 82 is snapped over pivot 50 and the left end of lever 70 is snapped into the opening 84 in member 26. The process of assembly is now complete, and it will be noted that this can be accomplished with relative simplicity and without the need for tools or special fixtures. The process of disassembly is simply the reverse and need not be explained.

Figure 5:
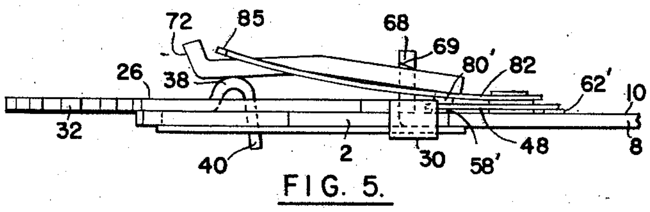
FIGURE 5 is a side elevation of the slide assembly similar to FIGURE 2 but showing the slide members moved relatively to lock the cam element.

From a standpoint of the user of the tuner its operation is essentially conventional and similar to the operation described in said Patent 2,989,767, although the novel structural details disclosed herein represent improvements with respect to operability and considerations of cost and maintenance. It will be understood that FIGURES 1 to 4 show the assembly with the cam 48 in its unlocked condition, i.e. the cam is free for rotation by engagement thereof with the treadle bar. FIGURE 5 shows the assembly with the cam 48 locked, i.e. upon an engagement of the cam with the treadle bar it does not rotate freely, but to the contrary, acts upon the treadle bar to adjust it to the tuning of a pre-selected station. When the cam 48 is to be reset, the user will tune in the station to which resetting is desired manually, thereby positioning the elements 55 and 57 of the treadle bar in correspondence with the tuning selected. The button 34 of the assembly to be reset is then pulled outwardly, which results in the end of lever 70 riding off the finger 38 from the FIGURE 5 position to the position shown in FIGURES 1 to 4. It will be noted that the outward movement of slide member 26 cannot frictionally drag lever 70 backward, away from cam 48, because the bosses 78′ and 80′ are restrained by shoulders 89. It will be noted that as this occurs the right end of spring 82 acts upwardly against the right end lever 70 to insure that the bosses 78′ and 80′ are released from engagement with cam 48. Also, the left end 85 of spring 82 continually presses downwardly against the left end of lever 70 as previously explained. The cam 48 is now free for rotation. When the pushbutton 34 is then moved inwardly relative movement between members 2 and 26 is yieldably prevented by the engagement of abutment 38 with the cam surface 72, the spring 82 acting downwardly against the lever 70 to resist the riding of the cam surface over the abutment 38. Therefore, both slide members 2 and 26 move inwardly together, with the cam 48 readily rotatable, until the cam engages the elements 55 and 57. When this condition is reached, movement of the slide member 2 is arrested and the application of continued pressure to actuating slide member 26 overcomes the resistance offered by lever 70. Thus the abutment 38 rides under cam surface 72, the left end of lever 70 thereby being cammed upwardly against the action of spring 82. Inward movement of member 26 continues until the elements reach their relative position illustrated in FIGURE 5, at which point the cam 48 is firmly clamped between the bosses created by indentation 58, 60 and 62 and the bosses 78' and 80'. The downward clamping movement of bosses 78' and 80' results from the action of lever 70 in being pivoted in a clockwise direction about the fulcrum provided by ears 66 and 68. It will be noted that by virtue of the bevel 69 the effective fulcrum point provided by ears 66 and 68 is located at the right side thereof and toward the right end of lever 70. Thus the ratio of leverage, or mechanical advantage, of lever 70 is increased to effect greater force in the clamping of cam 48. Once the locking of cam 48 has been effected, it can be unlocked only by relative outward movement of the actuating slide member 26. However, referring to FIGURE 5, such outward movement is effectively prevented by virtue of the lever 70 and the spring 82. In FIGURE 5 it will be noted that in the locked condition of the assembly the underside of lever 70, inwardly of the cam surface 72, bears on the abutment 38 and this portion of the underside of lever 70 slopes downwardly and to the left as illustrated. A substantial force is exerted downwardly against the lever 70 by spring 82 and this factor together with the just described slope of the lever are responsible for the yieldable locking of the members 2 and 26 with respect to each other in the FIGURE 5 position. Lever 70 must be raised before abutment 38 may close its end. The force exerted by spring 82 is substantial because, as shown in FIGURE 5, it is bowed considerably at its approximately central location by the right end of lever 70.

The net result of the above features is that the cam 48 will not be unlocked by vibrations ordinarily encountered and it is not likely that the slide member 26 will be accidentally moved, considerable force being required for its outward movement.

It will be understood that various departures from the specifically disclosed embodiment of the invention may be effected without departing from the scope of the invention as defined by the following claims:

What is claimed is:

1. A tuner slide assembly comprising first and second elongated slide members overlapping each other for a portion of their respective lengths, means guiding said members for relative sliding movements between first and second positions respectively, a cam pivotally mounted on said first member, a lever overlying said slide members, said lever including first and second ends, said first end being positioned adjacent said cam and movable into engagement therewith to lock said cam against pivotal movement, said lever having an aperture intermediate said ends thereof, projection means rigid with and extending outwardly from said first member and passing through said aperture, said projection means having arm portions overlying and engaging said lever for defining a fulcrum for said lever and for removably locking said lever in position, the width of said fulcrum across said arm portions being less than the length but greater than the width of said aperture, camming means on said second member positioned for engagement with said second end of said lever and for moving said lever about said fulcrum to lock said cam when said slide members are in said second position, spring means for biasing said lever into engagement with said fulcrum and for biasing said second lever end against said engaging camming means, and means resiliently engaged by said spring for removably securing said spring in the assembly.

2. An assembly according to claim 1 wherein said resiliently engaged means are rigidly secured to one of said slide members and engaged in locking relationship with said spring for removably securing said spring in the assembly.

3. An assembly according to claim 2 wherein said resiliently engaged means include a projection extending outwardly from said first slide member, said projection pivotally mounting said cam.

4. An assembly according to claim 2 wherein said spring includes an aperture receiving said resiliently engaged means, the resiliency of said spring removably maintaining said resiliently engaged means within said aperture in said spring.

5. An assembly according to claim 1 wherein said spring includes means abutting a portion of said lever for preventing sliding movement of said lever upon relative movement of said slide members.

6. An assembly according to claim 5 wherein said spring means comprise an elongated leaf spring having an opening therein, the edges defining said opening comprising said abutting means.

7. The assembly according to claim 6 wherein said lever passes through said opening in said spring, said spring overlying and underlying opposite ends of said lever.

8. A tuner slide assembly comprising first and second elongated slide members overlapping each other for a portion of their respective lengths, means guiding said members for relative sliding movements between first and second positions respectively, a cam pivotally mounted on said first member, a lever having one end positioned over said cam and adapted, when moved against said cam, to lock said cam against movement, means on said first member providing a fulcrum engaging said lever intermediate the ends thereof, camming means on said second member for engaging the other end of said lever to move said lever about said fulcrum for locking said cam when said slide members are in said second position, an oblong leaf spring having a central opening, the edges of said leaf spring defining said opening underlying the lever at said one end thereof and forming an abutment adjacent a portion of said one end of said lever for restraining sliding movement of said lever, a portion of said leaf spring overlying said other end of said lever for resisting the camming action of said camming means and for resisting said sliding movement of said slide members relative to each other.

9. An assembly according to claim 8 further including means removably securing said spring in the assembly, said removable securing means including means rigidly secured to one of said slide members and resiliently engaged by said spring in locking relationship therewith.

10. A tuner slide assembly comprising first and second elongated slide members overlapping each other for a portion of their respective lengths, means guiding said members for relative sliding movements between first and second positions, a pivot protruding upwardly from said first member, a cam pivotally mounted on said pivot, a lever overlying said slide members and having upper and lower surfaces with respect thereto, one end of said lever being positioned over said cam and adapted, when pressed against the cam, to lock said cam against pivotal movement, means on said first member providing a fulcrum intermediate the ends of said lever and acting on the upper surface thereof, said lever including means for removably maintaining said lever in engagement with said fulcrum, camming means on said second member for engaging the other end of said lever for moving said lever about said fulcrum for locking said cam when said slide members are in said second position, an oblong leaf spring extending lengthwise of said members and having an approximately central portion underlying said one end of said lever and in engagement therewith, said spring having one end thereof overlying and bearing against said other end of said lever, the other end of said spring resiliently engaging said pivot in removable locking relationship therewith, said locking relationship forming the sole connection between said spring and the assembly for removably retaining said spring and said lever in the assembly.

11. The assembly as claimed in claim 10 wherein said fulcrum is T-shaped and wherein said means for removing said lever from engagement therewith comprise an aperture in said lever having a one dimension less than the width of said fulcrum and a transverse dimension greater than said width.

References Cited in the file of this patent

UNITED STATES PATENTS

| | | |
|---|---|---|
| 2,390,000 | Sampson | Nov. 27, 1945 |
| 2,489,544 | Schwarz et al. | Nov. 29, 1949 |
| 2,659,236 | Allen | Nov. 17, 1953 |
| 2,793,531 | Thompson | May 28, 1957 |
| 2,898,767 | Teaf | Aug. 11, 1959 |
| 2,996,925 | Stamm | Aug. 22, 1961 |